INVENTOR
JOHN R. ALBERS
BY David M. Davis
HIS ATTORNEY

Patented Oct. 16, 1945

2,386,921

UNITED STATES PATENT OFFICE 2,386,921

ELECTRICAL CONTROL SYSTEM

John R. Albers, Sioux City, Iowa, assignor to Wincharger Corporation, a corporation of Minnesota Application May 10, 1943, Serial No. 486,314

6 Claims. (Cl. 320—33)

This invention relates to electrical control systems and more particularly to such systems and associated apparatus for charging batteries.

In battery charging systems incorporating a generator which is driven by a variable speed prime mover such as an internal combustion engine or wind driven equipment, it is desirable to take maximum energy from the prime mover even at generator voltages which correspond to voltages below the maximum battery voltage. In other words, it is desirable to connect the generator to the battery whenever the generator voltage exceeds the actual battery voltage. In wind driven equipment, especially where such equipment is to be used in areas where low wind velocity prevails periodically, it is necessary to take full advantage of the changing wind conditions for effecting maximum battery charging. If the generator is connected to the battery only in response to a wind blowing fast enough so that the generator voltage exceeds a voltage approximately equal to maximum battery voltage, regardless of the actual battery voltage, the wind driven generator may be driven for quite a long period of time at a voltage somewhat less than the critical voltage needed to close the circuit between the battery and generator and at a generator voltage greater than the actual battery voltage. Under these conditions the available wind energy is lost.

In its broader aspects, this invention has for an object to provide a new and improved system and apparatus for connecting a source of variable voltage to a load of variable back electromotive force, whenever the voltage of the source exceeds the voltage of the load. This invention has particular applicability to a battery charging system.

It is therefore an object of this invention to provide an improved relay for connecting a generator to a battery in a battery charging system.

Another object of this invention is to provide an improved relay in a battery charging system in which actuation of the relay is dependent upon battery voltage.

Another object of this invention is to provide improved means for supplying current from a source to a load of varying back electromotive force.

Still another object of this invention is to provide an improved and more efficient battery charging system incorporating a variable speed prime mover, for example, in wind charging systems where the prime mover may turn at a low speed for a considerable period of the day.

Another object of this invention is to provide an improved relay in a battery charging system wherein the relay is made sensitive to battery voltage, generator voltage and reverse current.

A further object of this invention is to provide an improved "cutout" relay in a battery charging system.

Another object of this invention is to provide improved means for connecting a battery charging generator to a battery, not only including means responsive to battery voltage and reverse current, but also to the condition of the battery.

Another object of the present invention is to provide compensating means for a "cutout" relay whereby it closes at a voltage only slightly greater than actual battery voltage instead of at a voltage determined by the mechanical characteristics of the relay itself.

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which:

Figure 1:
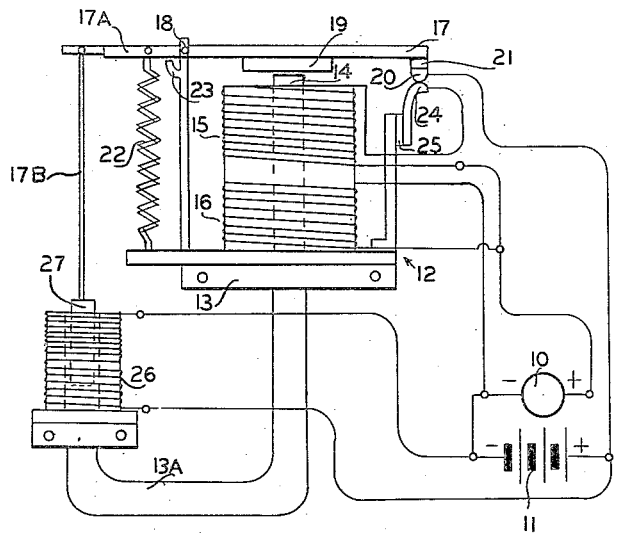
Figure 1 shows a preferred embodiment of my invention.

In Figure 1, a generator 10 is connected to a battery 11 through a relay 12, embodying my invention. The generator 10 is driven by a prime mover which may be an internal combustion engine, wind driven equipment, or the like.

The relay 12 has a stationary frame 13 having securely mounted thereon a cylindrical magnetizable core 14 upon which is mounted a current winding 15 and a voltage winding 16. These windings are arranged to transmit magnetic flux through the magnetizable core 14 in the same direction when the generator 10 charges battery 11 and in opposite directions when the battery 11 tends to discharge through the generator 10.

The armature electric contact carrying member 17 of relay 12 is pivotally mounted on the frame 13 on a pivot 18, and has secured thereon a magnetizable member 19 which is attracted to the core 14 when sufficient magnetism is set up due to current flowing through coil 16. Contact 20 is carried by the pivoted member 17 and is insulated therefrom by means of insulation 21 through which contact 20 is supported on member 17. The pivoted member 17 tends to rotate clockwise by reason of magnetic forces between core 14 and magnetizable member 19. A tension spring 22 mounted between the stationary frame 13 and the projecting end 17A of pivoted member 17 tends to rotate the pivoted member 17 counter-clockwise. A projection 23 on frame 13 serves as a stop in limiting the counter-clockwise movement of pivoted lever 17 about its pivot 18.

Electrical contact 24, mounted in cooperating relationship with movable contact 20, is securely fastened to stationary frame 13 but insulated therefrom by interposed insulation 25.

The generator 10 is connected electrically to the battery 11 through a series circuit including current coil 15 and contacts 20 and 24 of relay 12.

The voltage coil 16 is connected directly in parallel with the output terminals of generator 10. This coil 16 is adapted to transmit flux through the magnetizable core 14 in the same direction as that transmitted by coil 15 when coil 15 is energized by battery charging current. In other words, the coils 15 and 16 are arranged to act differentially when coil 15 is energized by battery discharge current.

A voltage sensitive coil 26 is mounted on a stationary frame extension 13A of frame 13 and a movable magnetizable member 27 is connected to pivoted member extension 17A by a link 17B and is disposed within the magnetic field of solenoid coil 26 so as to be drawn downward thereby. When the coil 26 is energized a force is applied to the pivoted member 17 tending to rotate it counter-clockwise about its pivot 18.

Coil 26 is made sensitive to battery voltage by connecting it in parallel to the battery 11.

The effect of connecting the movable magnet member 27 to the pivoted member extension 17A is to supplement the action of tension spring 22. When coil 26 is energized both the spring 22 and link 17B, together with magnetizable member 27, tend to rotate pivoted member 17 counter-clockwise. Thus the effect of connecting coil 26 in parallel with battery 11 is to cause the net force tending to rotate member 17 counter-clockwise to be a function of battery voltage. When the battery voltage is high, the action of tension spring 22 is supplemented to a greater degree than when the battery voltage is low. The net effect of this arrangement is that the contacts 20 and 24 are caused to be closed for low generator voltages when the battery voltage is low, and are caused to be closed only for higher generator voltages when the battery voltage is high.

Therefore, by the provision of the extra voltage coil 26 and associated connections there is provided an efficient battery charging system. With the system herein disclosed, if the battery voltage is low, energy is taken from the generator and stored in the battery even when the generator is driven at low speed.

This effect is of great importance in connection with a wind driven generator since, especially in areas of low average wind velocity, it is necessary to take advantage of all possible wind energy, even when the wind is of very low velocity. After a charging operation during which generator voltage has been high, the wind dies down and the generator voltage becomes less and less. The current through winding 16 correspondingly diminishes, and finally, as battery discharge current tends to flow through coil 15, the flux set up by coil 15 is in opposition to the flux set up by winding 16. Consequently, the contacts 20 and 24 separate under the influence of tension spring 22 and solenoid 26.

Tension spring 22 is adjusted to cause the contacts 20 and 24 to open when a minimum of battery discharge current flows through contacts 20 and 24. This adjustment of spring 22 is preferably made for the condition when the voltage of battery 11 is lowest since then the supplementary action of solenoid 26 is a minimum.

Figure 2:
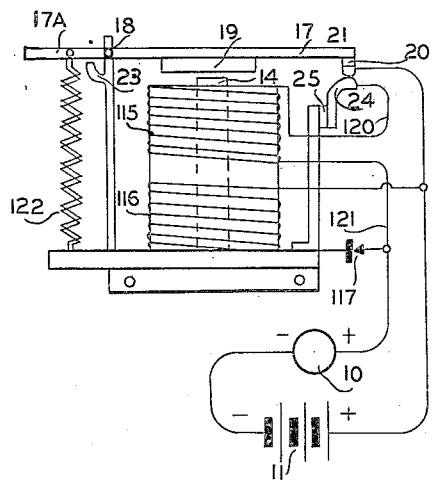
Figure 2 shows another embodiment of my invention.

Figure 2 illustrates a modification of my invention in which certain structural features are identical with those shown in Figure 1, and accordingly parts in Figure 2 identical to the parts shown in Figure 1 are given the the same reference numerals as corresponding parts in Figure 1. The relay of Figure 2 is responsive to the difference between generator voltage and battery voltage by reason of a circuit having a voltage coil 116 and unilateral conductive element or rectifier 117 which are connected in series with the oppositely poled battery and generator. The voltage coil 116, connected in a series circuit between the oppositely poled battery 11 and generator 10, has current flowing therethrough only when the generator voltage exceeds the voltage of battery 11 because rectifier 117 is poled to prevent flow of current in the opposite direction. Current coil 115, connected in series between the generator and battery and in series with contacts 20 and 24 through conductors 120 and 121, is mounted on the same magnet core 14 as is the voltage coil 116. Coils 115 and 116 are adapted to transmit magnetic flux in the same direction when the generator voltage exceeds the battery voltage and when battery charging current flows through current coil 115.

In other words, the polarities of coils 115 and 116 are such that, when the voltage of generator 10 becomes less than the voltage of battery 11, the battery discharge current which tends to flow through coil 115 sets up a magnetic flux in opposition to that produced in coil 116 when it has current therethrough. The unilateral conductive element or rectifier 117 allows current to flow through coil 116 only when the voltage of generator 10 exceeds the voltage of battery 11.

The rectifier 117 may be any of the well known types in the art, for instance, rectifier 117 may be a copper oxide or selenium rectifier, a vacuum tube, or a gaseous discharge tube.

In the arrangement shown in Figure 2, when the generator voltage exceeds the battery voltage the switch formed by contacts 20 and 24 closes and the battery charging current through coil 115 is in a direction to maintain the switch closed. As the generator voltage becomes less than the battery voltage, the flux set up by coils 115 and 116 correspondingly becomes less until the switch opens under the influence of tension spring 122. The tension spring 122 is preferably so adjusted that it causes contacts 20 and 24 to separate before battery discharge current flows through current coil 115.

Also it is to be noted that when contacts 20 and 24 have just closed, the serially connected coil 116 and rectifier 117 are shunted by the current coil 115, and the flux due to coil 116 decays slowly to a value less than was necessary to close contacts 20 and 24 and the charging current which builds up quickly through coil 115 is the principal factor in maintaining the relay in its circuit closing position. The large inductance of coil 116 does not allow the flux in coil 116 to change rapidly when the voltage across coil 116 changes. Also, since the unidirectional device 117 has a high resistance for the flow of reverse currents in the coil 116, a decrease of generator voltage below battery voltage would require reverse current to flow through rectifier 117 to cause coil flux to collapse rapidly, and the rectifier characteristic prevents such reverse current.

As battery discharge current tends to flow in current coil 115, the voltage induced in coil 116 by such current change in coil 115 causes a current to flow through unidirectional device 117 in its conducting direction so as to tend to neutralize the magnetic flux set up in core 14 by discharge current in coil 115. That is, rectifier 117 prevents induced current flow in coil 116 upon sudden increase of current in charging direction in coil 115, but allows current flow in coil 116 upon decrease of charging current in coil 115 or reversal of current flow in coil 115 so that such decrease or reversal of charging current in coil 115 is opposed, and change of flux in core 14 is slowed down. Spring 122 is made strong enough to lift armature 17 during this slowed reversal of flux upon decrease of generator voltage below battery voltage.

Chattering in the relay of Figure 2 may be avoided by making the voltage differential between generator 10 and battery 11 necessary to close the relay of suitable high value consistent with the voltage drops which appear in the battery charging circuit when contacts 20 and 24 close. It is, of course, realized that battery charging current through coil 115 produces a flux in such direction as to help in maintaining the contacts 20 and 24 closed when battery charging current flows therethrough.

One of the advantages of the arrangement shown in Figure 1 is that apparatus now in commercial use having a voltage coil 16 and current coil 15 may be readily transformed to incorporate the beneficial results produced by the supplementary action of solenoid 26, magnetizable core 27 and link 17B. Most of the commercial relays have an extension for joining the link 17B thereto so as to supplement the action of spring 22.

One of the advantages of the arrangement shown in Figure 2 is that only two windings are necessary and the voltage coil 116 is a low voltage winding. The arrangement shown in Figure 2 lends itself to a more compact structure than does the arrangement shown in Figure 1, but because of its simplicity and ease of adjustment the arrangement shown in Figure 1 is preferred.

My invention in its broader aspects comprises the method and apparatus for producing a differential characteristic or effect and using that characteristic or effect for connecting a source of variable voltage to a circuit having a variable source of back electromotive force. In the arrangement shown in Figure 1, the differential characteristic or effect is produced by the joint action of generator voltage on the actuating coil 16 and of battery voltage on the solenoid 26. In the arrangement shown in Figure 2, the differential characteristic or effect is produced by the particular manner in which actuating coil 116 is connected in a series circuit including the battery and generator of polarity opposite to the battery polarity.

While I have shown and described the particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

I claim:

1. In a system for connecting a source of variable voltage to a circuit including a source of variable back electromotive force, an electrical switch arranged for connecting said sources, said electrical switch having a fixed and a relatively movable contact, means responsive to a predominance of said voltage over said electromotive force for closing said switch, said means including electromagnetic means responsive solely to said variable back electromotive force for urging said contacts apart, and permanent switchless circuit connections between said source of variable back electromotive force and last mentioned electromagnetic means such that current flows therethrough regardless of the magnitude of said source of variable voltage and causes urging of said contacts apart.

2. In a battery charging system, a battery, a generator for charging the battery, means for connecting the generator to the battery, said means including a contact member, means responsive to battery voltage and independent of generator voltage for biasing said contact member to circuit opening position, means responsive to generator voltage for moving the contact to circuit closing position against the force of said biasing means, and permanent switchless circuit connections between said battery and said battery voltage responsive means such that current flows therethrough regardless of the magnitude of the voltage of said generator and causes biasing of said contact member to circuit opening position.

3. In a battery charging system, a battery, a generator for charging the battery, means for connecting the generator to the battery, means for biasing said contact member to circuit opening position, means responsive to generator voltage for moving said contact member against said biasing means to circuit closing position, means responsive to battery voltage and independent of generator voltage for altering the effect on said member of said biasing means, and permanent switchless circuit connections between said battery and battery voltage responsive means such that current flows therethrough regardless of the magnitude of generator voltage and aids the effect on said member of said biasing means.

4. In combination, a relay for controlling the charging of a battery and having contacts which are opened and closed according to the movement of the relay armature, a battery, a voltage source, means responsive to source voltage for moving said armature in the direction to close said contacts, electromagnetic means responsive to battery voltage and independent of source voltage for moving said armature in the direction to open said contacts, and permanent switchless circuit connections between said battery and battery voltage responsive means such that current flows therethrough regardless of the magnitude of said voltage and causes movement of said armature in the direction to open said contacts.

5. In combination, a relay for controlling the charging of a battery and having contacts which are opened and closed according to the movement of the relay armature, a battery, a voltage source, means responsive to source voltage for moving said armature in the direction to close said contacts, means responsive to battery voltage and independent of source voltage for moving said armature in the direction to open said contacts, a spring normally biasing said contacts in open position, and a permanent switchless circuit connection between said battery and battery voltage responsive means such that current flows therethrough regardless of the magnitude of said source voltage and causes movement of said armature in the direction to open said contacts.

6. In combination, a relay for controlling the charging of a battery and having contacts which are opened and closed according to the movement of the relay armature, a battery, a voltage source, means responsive to source voltage for moving said armature in the direction to close said contacts, means responsive to battery voltage and independent of source voltage for moving said armature in the direction to open said contacts, means responsive to current flowing from said source to said battery through said contacts for maintaining said contacts closed, and permanent switchless circuit connections between said battery and battery voltage responsive means such that current flows therethrough regardless of the magnitude of said voltage source and causes movement of said armature in the direction to open said contacts.

JOHN R. ALBERS.